United States Patent
Nikolaev et al.

(10) Patent No.: US 7,856,877 B2
(45) Date of Patent: Dec. 28, 2010

(54) ROTOR BALANCING METHOD AND DEVICE THEREFORE

(76) Inventors: Alexandr Nikolaevich Nikolaev, Prospekt Pobedy. 113-73, Penza (RU) 440047; Boris Avraamovich Malev, Ul. Bakunina, 27-11, Penza (RU) 440060; Leonid Alekseevich Bryakin, Ul. Initsiativnaya, 27, Penza (RU) 440007; Mikhail Aleksandrovich Scherbakov, Ul. Mira, 74-40, Penza (RU) 440046; Sergey Vyacheslavovich Kochkin, Ul. Sumskaya, 11-28, Penza (RU) 440015

( * ) Notice: Subject to any disclaimer, the term of this patent is extended or adjusted under 35 U.S.C. 154(b) by 607 days.

(21) Appl. No.: 11/576,003

(22) PCT Filed: Oct. 5, 2005

(86) PCT No.: PCT/RU2005/000499
§ 371 (c)(1),
(2), (4) Date: Mar. 26, 2007

(87) PCT Pub. No.: WO2006/038835
PCT Pub. Date: Apr. 13, 2006

(65) Prior Publication Data
US 2008/0060436 A1    Mar. 13, 2008

(30) Foreign Application Priority Data
Oct. 6, 2004   (RU) .................. 2004129262

(51) Int. Cl.
*G01M 1/02*   (2006.01)

(52) U.S. Cl. ............................. 73/462; 73/471; 73/474
(58) Field of Classification Search ............... 73/462, 73/471, 472, 474
See application file for complete search history.

(56) References Cited

U.S. PATENT DOCUMENTS

| 4,464,934 A | 8/1984 | Giers |
| 4,930,348 A * | 6/1990 | Bandhopadhyay et al. .... 73/472 |
| 5,359,885 A | 11/1994 | Ohms |
| 6,430,992 B1 | 8/2002 | Goebel |

FOREIGN PATENT DOCUMENTS

| EP | 0150274 A2 | 8/1985 |
| RU | 2105962 C1 | 2/1998 |

OTHER PUBLICATIONS

B.A. Malev et al., RU 2105962 abstract, esp@cnet database (1998).
A. Giers, EP0150274 abstract, esp@cnet database (1985).

* cited by examiner

Primary Examiner—John E Chapman
(74) Attorney, Agent, or Firm—Paul & Paul

(57) ABSTRACT

The present invention is based on imparting of oscillatory motion to a rotor and to a coaxial balanced body relative to a fixed point selected at the common axis of the rotor. To eliminate an interference of imbalance datum planes on the parameters to be measured, at one stage of measurements the fixed point is used as the crossing point of the rotor axis with one of the imbalance datum planes, whereas at the next stage the rotor is along its axis by a fixed distance to a second position. The measured parameters are used to determine imbalance parameters in two imbalance datum planes.

8 Claims, 3 Drawing Sheets

ROTOR BALANCING METHOD AND DEVICE THEREFORE

CROSS-REFERENCE TO RELATED APPLICATIONS

This is a national stage 371 application of International Application No. PCT/RU2005/000499, filed Oct. 5, 2005, and claims the priority of Russian Application no. RU2004/129262, filed Oct. 6, 2004.

FIELD OF THE INVENTION

The present invention relates to the technique for dynamic balancing of rotating bodies and may be used for measuring and correcting forces generated by unbalance of rotors, in particular, rigid rotors.

BACKGROUND OF THE INVENTION

A method for rotor balancing provides for the measurement of rotor imbalance parameters (amount of out-of-balance mass, radius and angle of its center disposition relative to a rotor axis) by means of determining two unbalance vectors (unbalance is a vector quantity that is equal to the unbalanced mass multiplied by its center radius-vector relative to the axis) that are arranged in two arbitrary planes being perpendicular to a rotor axis. These planes are called as imbalance datum planes or imbalance correction planes (see, for example, M. E. Levit, V. M. Ryzhenkov "Balancing of Parts and Units", Moscow, Mechanical Engineering, 1986).

There are widely known methods for rotor balancing that are based on imparting rotary motion to a rotor and measuring its oscillation amplitudes and phases in the planes being perpendicular to a rotor axis (e.g. EP No. 0150274, 1985). In accordance with this method, the imbalance datum planes are set up with the help of supports, in which a rotor is installed; in doing so, the rotor oscillation amplitudes and phases are measured by means of measuring dynamic loads generated in the supports. A limitation of this method is that parameters to be measured must be exposed to additional processing to share unbalance data in different imbalance datum planes.

There is known a method for rotor balancing, which is based, as the above one, on imparting rotary motion to a rotor mounted on the supports. A peculiarity of this method is that after measurement of oscillation parameters with the rotor to be at a certain position for the purpose of making the rotor imbalance datum planes shared, the rotor is turned by 180° and the rotor oscillation phase and amplitude are measured again, followed by processing the measured parameters and determining the unbalance rate to be found in each of imbalance datum planes (U.S. Pat. No. 5,359,885, 73/146, 1994). A drawback with this method consists in labor intensity and low efficiency.

A method that is realized with the help of a single distributed support, in which the rotor is set up with its one end face, is more convenient in operation. This method is characterized by the rotor to be driven in rotary motion and by the measurement of dynamic loads applied in the support lateral planes to be symmetrically relative to the rotor axis (e.g. U.S. Pat. No. 6,430,992, 73/66, 2002). A drawback with this method consists in complexity of processing of parameters to be measured for the determination of imbalance in each datum plane.

All the methods based on the impartment of rotary motion to the rotor when it is set up in the supports are limited with the used techniques affecting measurement results for vibrations caused by outrun of coupling bearing surfaces, journal ovalness, misalignment of outer rings, the presence of a lubricant in support bearings etc.

The present invention relates to a fundamentally different method of balancing that is characterized by a complex motion of a rotor. While using sufficiently simple techniques this method makes it possible to improve the accuracy of measuring imbalance parameters.

This method is known from the USSR Inventor's Certificate No. 297890, G01M1/38, 1971. According to this method the rotor is set up in the position, at which its axis is directed at an acute angle to the selected, e.g. vertical, axis, and oscillatory motion is imparted to the rotor relative to a fixed point of intersecting its axis with the selected vertical axis. In so doing, a rotor motion is provided such that a projection of a motion path of any rotor axis point onto a horizontal plane is symmetrical with respect to the vertical axis.

Improvement of this method, known from the Russian Patent No. 2105962, G01M1/38, 1993, is aimed at improving a balancing accuracy at the expense of decreasing the rotor angular oscillations affecting parameters to be measured. This method, like the above one, consists in imparting oscillatory motion to the rotor relative to a fixed point located on the rotor axis and measuring the rotor angular oscillation amplitude and phase, by which rotor imbalance parameters can be judged in one of the imbalance planes. To improve balancing accuracy, a reference system of measurements that makes it possible to decrease influence on the measured parameters of the rotor angular oscillations relative to its axis is configured. The reference system is configured by means of using a balanced body that is coaxial with the rotor; said body being set in motion simultaneously with the rotor. This method may be considered as the closest prior art with respect to the present invention.

In the implementation of this method, however, some rotor oscillations take place and, hence, balancing of the body in the plane perpendicular to the rotor axis is changed; as a result, balancing accuracy is affected negatively.

The closest prior art device to be used for the claimed method is a device known from the Russian Patent No. 2105962, G01M1/38, 1993 and designed for using the balancing method based on imparting the oscillatory motion to the rotor. This device comprises a bed plate, a shaft with a spherical support fit at its one end and joined to a drive shaft with a variable eccentric and being set up on the rotor and installed inside the balanced body on the elastically flexible flat part that makes it possible to offset relative to the balanced body axis, as well as unbalance control sensors, a reference signal sensor and a sensor output signal processing unit. The signal processing unit comprises a pulse sequence generator with its input connected to the reference signal sensor, a binary counter, a trigger, a storage register block, a decoder and an imbalance angular coordinate and value indicator. The above unit elements are interconnected in accordance with the circuit providing measurement of imbalance parameters.

The drawback to this device, as well as the known method consists in not sufficiently high rate of balancing accuracy because of rotor oscillations in the plane that is perpendicular to its axis.

SUMMARY OF THE INVENTION

The technical effect to be achieved when using the present invention is to improve accuracy of measurements of the rotor angular oscillation amplitude and phase at the expense of decreasing the influence (in the ideal case—at the expense of eliminating thereof) of angular oscillations of the balanced body relative to its axis on parameters to be measured.

In accordance with the present invention, the method that comprises imparting of oscillatory motion to a rotor and to a coaxial balanced body relative to a fixed point selected at the common axis of the rotor and the balanced body, and measuring amplitude and phase of the rotor angular oscillations by which rotor imbalance parameters are judged, additionally comprises a new procedure, namely: simultaneously in each time of determining unbalance in the plane passing through the above fixed point, forces opposing angular oscillations of the balanced body relative to an axis are exerted to the balanced body tangentially.

When aligning the above fixed point with the point of intersecting of the rotor axis with one of the rotor imbalance datum planes, the measured amplitude and phase of angular oscillations are used to judge imbalance parameters in other imbalance datum plane.

When displacing the rotor along the axis over a fixed distance and subsequent measuring an amplitude and phase of the rotor angular oscillations, imbalance parameters in the imbalance datum plane passing through the above fixed point are specified.

The technical effect provided by the choice of the position of the above fixed point consists in a further increase of accuracy of the method at the expense of elimination of an interference of imbalance datum planes on the parameters to be measured.

The technical effect obtainable when using the claimed device consists in a high balancing accuracy to be provided by applying simple technical means that do not distort the results of measuring the rotor imbalance parameters relative to the balanced body.

To implement the method, a device comprising a bed plate, a balanced body and a shaft designed to mount on it the rotor and fit inside the balanced body on a flexible support to move along the balanced body axis, said body being provided at one end with a spherical support and joined to a drive shaft with a variable eccentric, and also imbalance measurement sensors, a reference signal sensor and a sensor output signal processing unit. The device further comprises an additional flexible support for the balanced body, said support being fixed on the bed plate and opposing its angular oscillations in the plane passing through said spherical support center on the bed plate on which the other end of the balanced body is mounted.

Ease of using the device when determining imbalance parameters in the both imbalance datum planes is achieved by the fact that the rotor is mounted on the drive shaft to move along its axis and fix at two positions such that in the first position one of the rotor imbalance datum plane passes through the spherical support center and in the second position the plane is displaced with respect to the spherical support center.

To increase a balanced body inertia rate, the additional flexible support is made as a diaphragm rigidly mounted along the perimeter in the bed plate.

The imbalance sensors are installed such that centers of their sensing elements are arranged symmetrically relative to the balanced body axis on the same diameter, and their terminals are connected such that with an angular displacement of the balanced body sensor outputs are summed up and with a displacement in the plane perpendicular to the balanced body axis they are subtracted. This allows, with the rotor residual oscillations that take place in the plane perpendicular to the rotor axis, to ensure compensation of the influence of these oscillations on parameters to be measured.

The signal-processing unit comprises a control unit, an AD converter, a storage unit, a multiplier unit, a subtracting unit, an amplitude and phase measuring unit and an imbalance angular coordinate and rate indicator. A control unit input is connected to a reference signal sensor and an output—to driving inputs of the AD converter, the storage unit and the amplitude and phase measuring unit. Outputs of the imbalance value sensor are connected to an input of the AD converter signal, connected with its output to the inputs of the storage unit and amplitude and phase measuring unit, as well as to a first input of the subtracting unit, connected with its second input to the output of the storage unit via the multiplier unit. An output of the subtracting unit is connected to an input of the multiplier unit, connected with its output to the input of the imbalance angular coordinate and rate indicator.

EMBODIMENTS OF THE INVENTION

Figure 1:
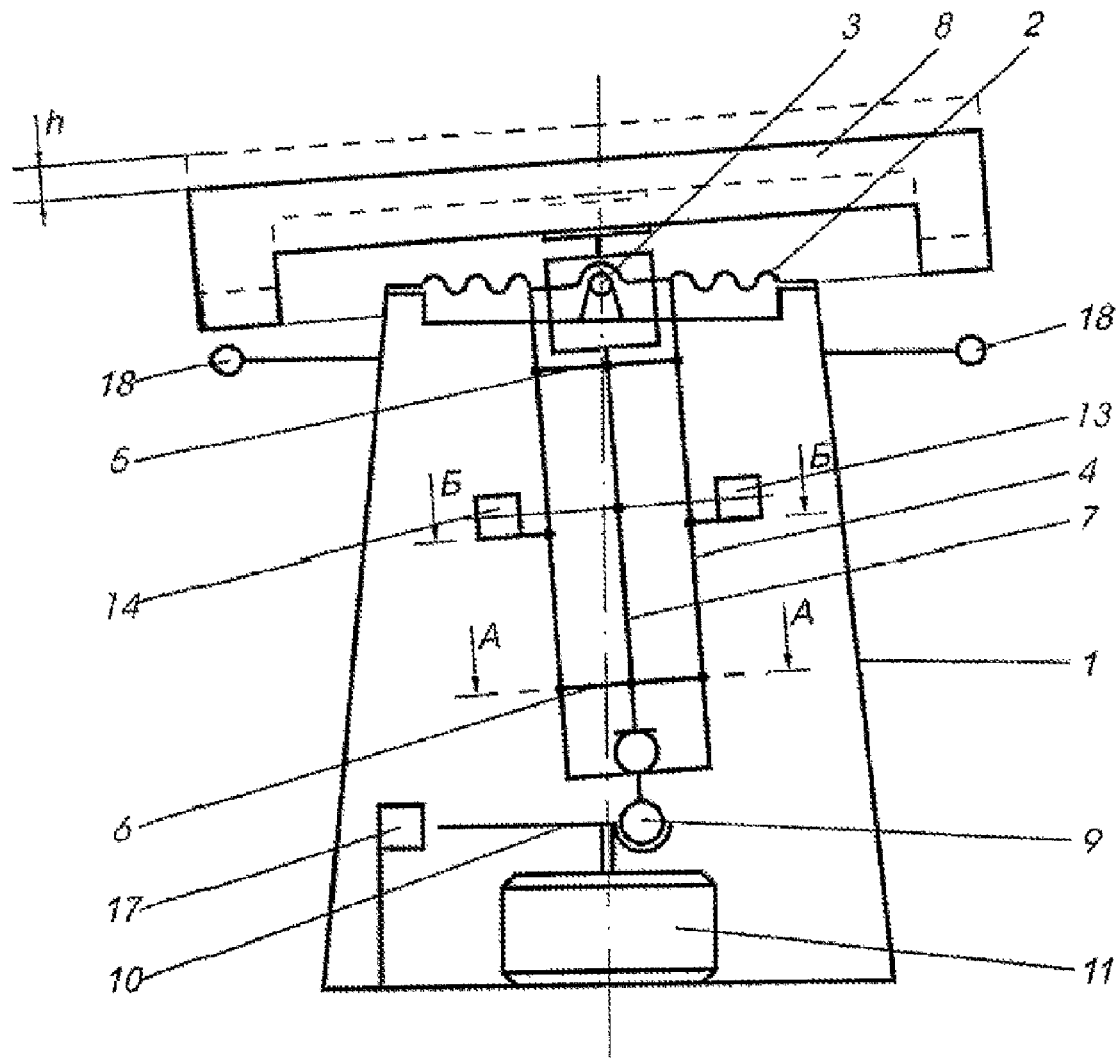
FIG. 1 schematically depicts the device, by means of which the method is implemented.

The rotor balancing device comprises a bed plate 1, in which a balanced body 4 is mounted with its one end on a flexible support 2 by means of a spherical support 3. A spherical support center 3 operates as a fixed point, relative to which the balanced body 4 makes oscillatory motion. A shaft 7 of a rotor 8 is coaxially fit inside the balanced body 4 on axis-centering flexible supports 5 and 6. The other end of the balanced body 4 is connected by means of a spherical support 9 to a variable eccentric 10 mounted on a drive shaft 11 installed on the bed plate 1. The rotor 8 is installed to move along its axis by the size h and fix in two positions such that in the first position one of the imbalance datum plane, e.g. the lower one, passes through the center of the support 3, and in the second position the plane is displaced with respect to the center of the support 3 by the size h, e.g. upwards. The size h is a distance that is selected on the basis of ease of measurement. It may be less than the distance between the rotor imbalance datum planes or equal to it.

A flexible support 2 is used to prevent angular oscillations of the balanced body 4 relative to the bed plate 1 in the planes that are perpendicular to body axis 4. Any support (springs, elastic bars, torsion bar etc) may be used as a flexible support. But it is preferred to use the diaphragm rigidly mounted along the perimeter of the bed plate 1, as this method of mounting allows increasing inertia rate of the balanced body 4 thus additionally improving accuracy of imbalance parameters.

Figure 2:
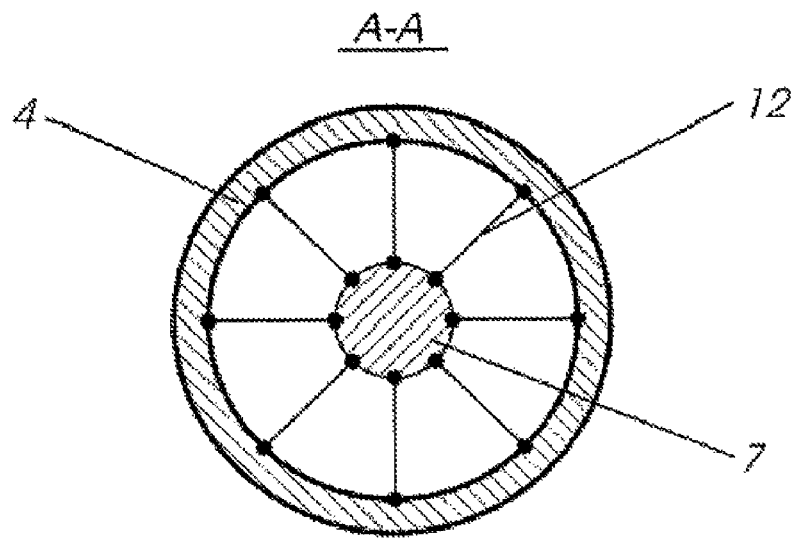
FIG. 2 depicts a section AA.

The supports 5 and 6 permit the shaft 7 of the rotor 8 to run on its axis limiting its angular oscillations and allows the rotor 8 to return in its initial position when the drive 11 stops. An embodiment shown in FIG. 2 depicts the supports 5 and 6 as bars 12.

Figure 3:
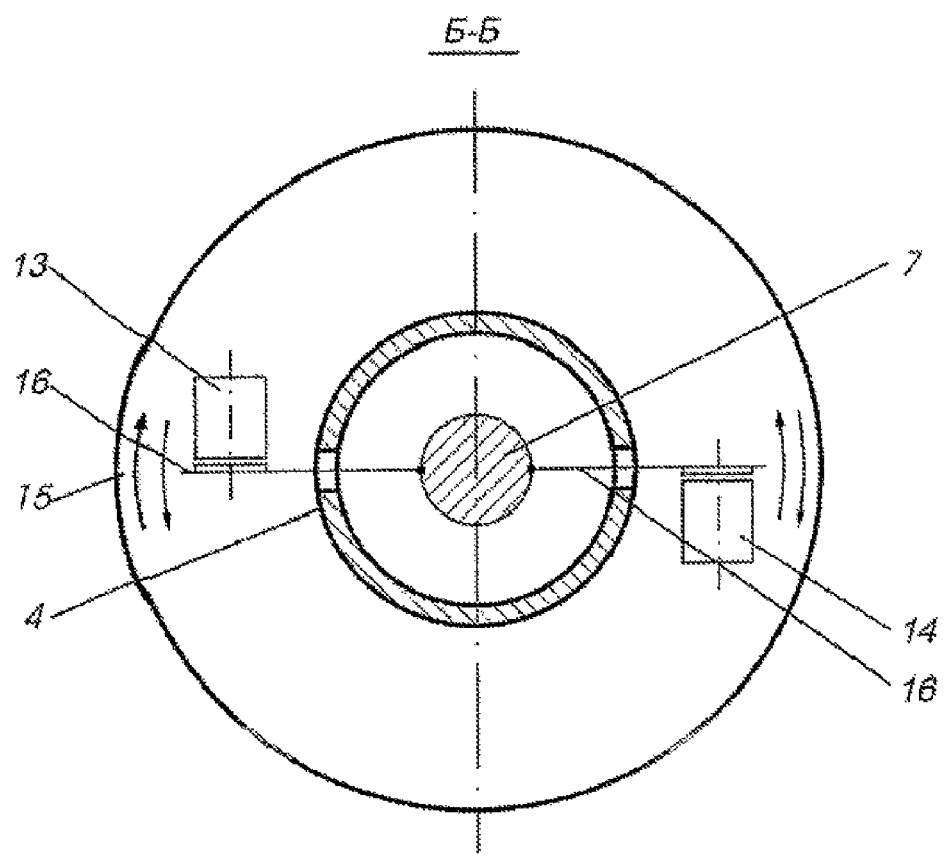
FIG. 3 depicts a section ББ.

Imbalance sensors 13 and 14 are located on a platform 15 that is mounted on the balanced body 4 in the plane perpendicular to its axis (FIG. 3). Sensing elements of the sensors 13 and 14 are arranged symmetrically to the axis of the balanced body 4 and fit at the same diameter. If, instead of the sensors 13 and 14, magnetic induction sensors are used, their armatures are mounted on connecting elements 16 that are rigidly joined to the shaft 7 of the rotor 8. Output terminals of the sensors 13 and 14 are such that the output signals of the sensors 13 and 14 are summed up if an angular oscillation of the balanced body 4 relative to the axis takes place, and are subtracted, if the axis of the balanced body 4 is misaligned in the plane that is perpendicular to its axis.

A variable eccentric 10 (FIG. 1) is connected to a reference signal sensor 17. Indicator lamps 18 depicting an imbalance rate angular coordinate to be found on the rotor 8 are arranged along the perimeter of the bed plate 1.

Figure 4:
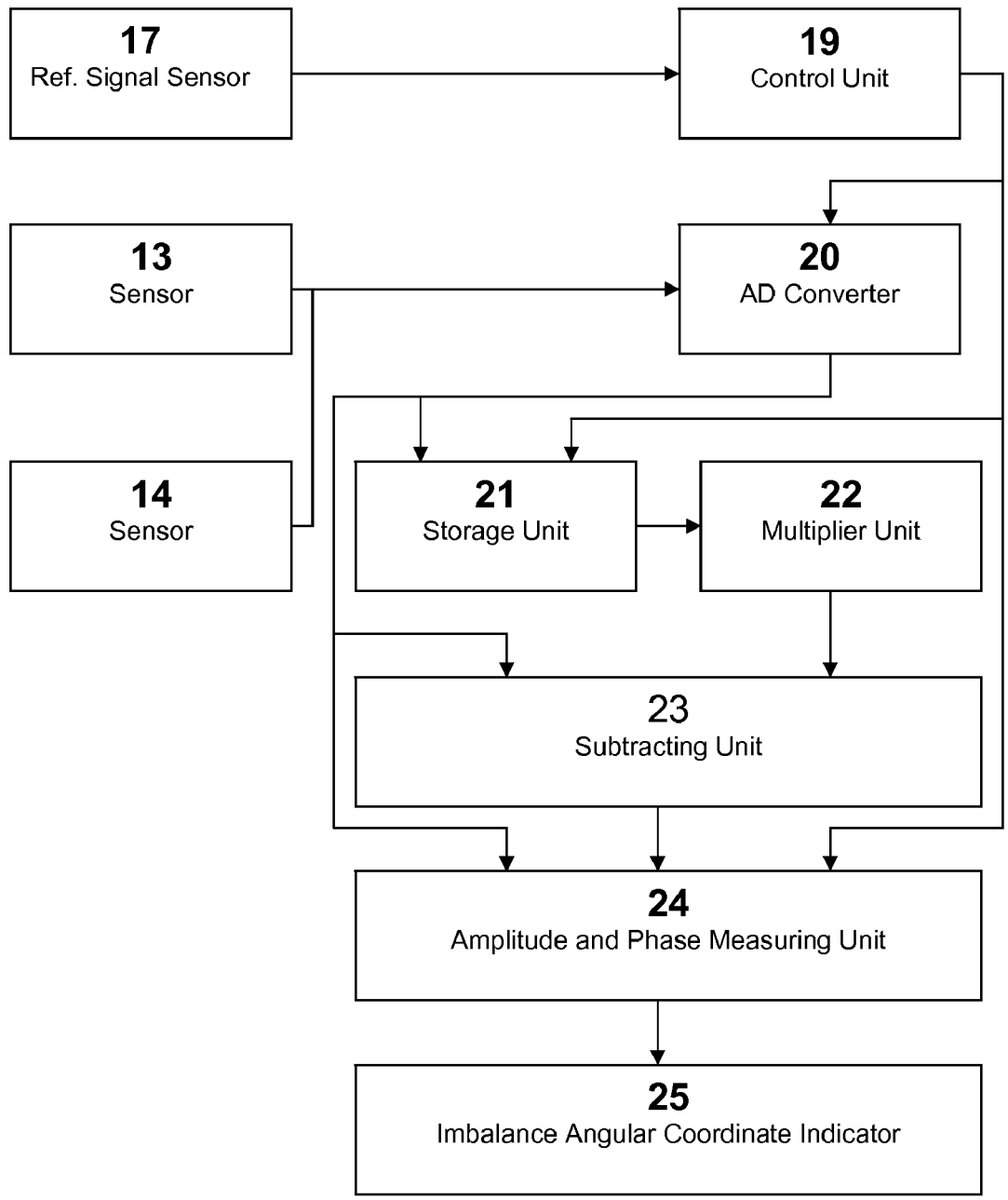
FIG. 4 depicts a sensor output signal-processing unit.

A signal processing unit (FIG. 4) from the outputs of the sensors 13 and 14 comprises a control unit 19, an AD converter 20, a storage unit 21, a multiplier unit 22, a subtracting unit 23, an amplitude and phase measuring unit 24 and an imbalance angular coordinate and value indicator 25. The input of the control unit 19 is connected to the reference signal sensor 17 and the output is connected to the driving points of the AD converter 20, the storage unit 21 and the amplitude and phase control unit 24. The outputs of the imbalance rate sensors 13 and 14 are connected to the signal input of the AD converter 20, connected with its output to the inputs of the storage unit 21 and the amplitude and phase measuring unit 24. The first input of the subtracting unit 23 is connected to the output of the AD converter 20 and the second input—to the output of the multiplier unit 22. The output of the unit 23 is connected to the indicator 25 via the unit 24.

At the initial moment, the rotor 8 and the balanced body 4 are mounted on the shaft 7 in the eccentric 10 on the support such that their axis is oriented at an acute angle to a vertical axis passing through the center of the spherical support 3 (see FIG. 1). In doing so, the position of the rotor 8 on the shaft 7 is selected such that one of the imbalance datum planes matches a lower plane of the rotor 8 (h=0). Then, the shaft of the drive 11 is brought to run, thereby oscillatory motion is imparted to the shaft 7 of the rotor 8 and to the balanced body 4 with respect to the center of the support 3 in the plane that is perpendicular to the drawing plane. With a rate of imbalance being found in the upper datum plane the torque drives the rotor 8 together with the shaft 7 about its axis (ideally, when the rotor 8 is balanced, it makes oscillatory motion about its axis without angular oscillations). Simultaneously, the rotor 8 performs oscillations in the plane that is perpendicular to its axis, and an amplitude of these oscillations is much higher than the amplitude of oscillations that are due to imbalance. Owing to flexible elements that join the balanced body 4 to the shaft 7 of the rotor 8, angular oscillations of the rotor 8 affect the body 4, but simultaneous exerting of forces at each moment to each point of the balanced body 4 in the plane passing through the center of the support 3, said forces being directed tangentially to the body, results in compensation of the influence of the flexible elements, i.e. in increase (removal) of angular oscillations of the balanced body 4 relative to its axis.

The rate of imbalance is measured with the sensors 13 and 14. If, instead of the sensors 13 and 14, magnetic induction sensors are used, the signal phases induced in their winding and caused by imbalance of the rotor 8 are coincident, and the amplitude of the sensor total signal is doubled (with their conversion ratio being equal). Thanks to the absence of angular oscillations of the balanced body 4 in the plane that is perpendicular to its axis, the output signal of the sensors 13 and 14 is determined only by imbalance of the rotor 8: $S_1=A_1 \sin(\omega t+\phi_1)$, where amplitude $A_1$ is determined by the imbalance rate and phase $\phi_1$—by an angular coordinate of its position. This signal is converted in the AD converter 20 into digital one and comes simultaneously to the signal input of the amplitude and phase control unit 24 and to the storage unit 21. As a result, the imbalance rate and upper plane angular coordinate data are generated at the output of the unit 24. The indicator 25 indicates the obtained data. At the same time, when the signal comes out of the reference signal sensor 17 that generate the timing signal of the measurement cycle start, the storage unit 21 memorizes snap data of signal $S_1$.

After imbalance is measured in the upper datum plane, the rotor 8 is moved along its axis by distance h and imbalance rate is measured in the lower datum plane of the rotor 8. To rule out any influence that may affect the imbalance upper datum plane measurements, the output signals of the sensors 13 and 14 are processed as follows. The signal, which specifies measurement of the digital signal amplitude and phase that comes from the output of the subtracting unit 23 is sent from the output of the control unit 19 to the amplitude and phase control unit 24. This unit subtracts signal S from the output of the AD converter 20 and signal $S_1$ from the output of the storage unit 21 multiplied by scale factor k in the multiplier unit 22. Scale unit k accepts a signal amplitude changing rates coming from sensors 13 and 14 that are specified by imbalance of the rotor 8 in the upper datum plane. Signal S taken at the AD converter 20 output looks as follows: $S=k S_1+S_2$, where $S_2=A_2 \sin(\omega t+\phi_2)$, $A_2$—amplitude of a signal that conforms to the rate of imbalance in the lower datum plane, $\phi_2$—signal phase. The output signal of the subtracting unit 23, where subtraction takes place ($S-k \cdot S_1$) conforms to imbalance of the rotor 8 of the lower datum plane and is equal to $S_2 =A_2 \sin(\omega t+\phi_2)$. This signal comes to the second signal input of the amplitude and phase measuring unit 24 and the indicator 25 that indicates the imbalance data of the rotor 8 in the lower datum plane. The indicator 25 may simultaneously indicate imbalance parameters that can be found in the both datum planes.

Thus, the use of the claimed method allows measurement of the rotor imbalance parameters with high accuracy in two imbalance datum planes. This method is easy in operation and does not need large costs for its implementation. The method may be used both in industrial and household conditions.

What is claimed is:

1. The method for rotor balancing comprising imparting of oscillatory motion to a rotor and to a coaxial balanced body relative to a fixed point selected at the common axis of the rotor and the balanced body, and measuring an amplitude and phase of the rotor angular oscillations by which rotor imbalance parameters are judged, characterized in that simultaneously in each time in the plane passing through the above fixed point, forces opposing angular oscillations of the balanced body relative to an axis are exerted to the balanced body tangentially.

2. The method as claimed in claim 1, characterized in that a crossing point of the rotor axis with one of the rotor imbalance datum planes is used as above fixed point, and the measured amplitude and phase of angular oscillation are used for the determination of the imbalance parameters in another imbalance datum plane.

3. The method as claimed in claim 2, characterized in that on measuring the amplitude and phase of the rotor angular oscillations in a first position when the above fixed point is aligned with the crossing point of the rotor axis with one of the imbalance datum planes the rotor is displaced by a fixed distance to a second position, then the amplitude and phase of the rotor angular oscillations are measured again and the measured amplitude and phase of the rotor angular oscillations are used for the determination of imbalance parameters in the plane that initially passes through a fixed point.

4. A rotor balancing device comprising a bed plate, a balanced body having a first end and a second end and a shaft designed to mount on it the rotor and fit inside the balanced body on a flexible support to move along the balanced body axis, said balanced body being provided at the first end with a spherical support and joined to a drive shaft with a variable eccentric, and also imbalance measurement sensors, a reference signal sensor and a sensor output signal processing unit, characterized in that it further comprises an additional spherical support which is mounted on said bed plate and an additional flexible support for the second end of the balanced body, said additional flexible support being made as a diaphragm fixed on said additional spherical support and being rigidly mounted along the perimeter in said bed plate.

5. The device as claimed in claim 4, characterized in that the rotor is mounted on the shaft to move along the rotor axis.

6. The device as claimed in claim 5, characterized in that the rotor is installed to fix in two positions such that in the first position one of the imbalance datum plane passes through the center of the spherical support, and in the second position the plane is displaced with respect to the center of the spherical support.

7. The device as claimed in claim 4, characterized in that imbalance rate sensors are located such that centers of their sensing elements are arranged symmetrically to the axis of the balanced body and fit at the same diameter, and their output terminals are connected such that the output signals of the sensors are summed up if an angular oscillation of the balanced body relative to the axis takes place, and are subtracted, if the axis of the balanced body 4 misaligned in the plane that is perpendicular to its axis.

8. The device as claimed in claim 4, characterized in that a signal processing unit comprises an AD converter, a storage unit, a multiplier unit, a subtracting unit, a control unit, an amplitude and phase measuring unit, where outputs of the imbalance rate sensors are connected to the input of the AD converter connected with its output to the information output of the storage unit, to the first input of the subtracting unit and the input of the amplitude and phase measuring unit, connected with its output to the imbalance angular coordinate and rate indicator, the output of the storage unit is connected via the multiplier unit to the second input of the subtracting unit connected with its output to the second input of the amplitude and phase measuring unit, the input of the control unit is connected to the output of the reference signal sensor and the output of the control unit is connected to the driving points of the storage unit, the AD converter and the amplitude and phase measuring unit control inputs.

* * * * *